United States Patent
Ozawa et al.

(10) Patent No.: US 7,701,502 B2
(45) Date of Patent: Apr. 20, 2010

(54) IMAGE SENSOR, FOCAL POINT DETECTION DEVICE AND CAMERA

(75) Inventors: Masamitsu Ozawa, Yokohama (JP); Shigeyuki Uchiyama, Komae (JP)

(73) Assignee: Nikon Corporation, Tokyo (JP)

( * ) Notice: Subject to any disclaimer, the term of this patent is extended or adjusted under 35 U.S.C. 154(b) by 850 days.

(21) Appl. No.: 11/299,628

(22) Filed: Dec. 13, 2005

(65) Prior Publication Data
US 2006/0133790 A1 Jun. 22, 2006

(30) Foreign Application Priority Data
Dec. 16, 2004 (JP) ............... 2004-364174

(51) Int. Cl.
*H04N 5/232* (2006.01)
*H04N 3/14* (2006.01)

(52) U.S. Cl. .............. 348/350; 348/297; 348/349; 396/121

(58) Field of Classification Search ........... 348/345, 348/350, 354
See application file for complete search history.

(56) References Cited

U.S. PATENT DOCUMENTS

| | | | | |
|---|---|---|---|---|
| 5,005,040 A | * | 4/1991 | Norita et al. ........... | 396/96 |
| 5,418,594 A | * | 5/1995 | Kusaka et al. ........... | 396/123 |
| 5,604,561 A | * | 2/1997 | Ozawa et al. ........... | 396/96 |
| 6,239,912 B1 | * | 5/2001 | Ozawa ........... | 359/618 |
| 6,310,649 B1 | * | 10/2001 | Hagiwara ........... | 348/345 |
| 6,577,344 B2 | * | 6/2003 | Kadohara et al. ........... | 348/350 |
| 6,781,632 B1 | * | 8/2004 | Ide ........... | 348/345 |
| 6,922,526 B2 | * | 7/2005 | Nakata et al. ........... | 396/96 |
| 7,454,133 B2 | * | 11/2008 | Takahashi ........... | 396/96 |
| 7,460,779 B2 | * | 12/2008 | Nakata ........... | 396/96 |
| 7,493,034 B2 | * | 2/2009 | Nakata ........... | 396/96 |
| 7,515,819 B2 | * | 4/2009 | Takahashi ........... | 396/121 |
| 7,589,764 B2 | * | 9/2009 | Nakata et al. ........... | 348/227.1 |

FOREIGN PATENT DOCUMENTS

| | | | |
|---|---|---|---|
| JP | A 4-179939 | 6/1992 |
| JP | A 6-331885 | 12/1994 |
| JP | A 10-288732 | 10/1998 |

* cited by examiner

*Primary Examiner*—Ngoc-Yen T Vu
(74) *Attorney, Agent, or Firm*—Oliff & Berridge, PLC (57) ABSTRACT

An image sensor includes: three or more photoelectric conversion devices; and a storage control circuit that controls storage operations at the photoelectric conversion devices, and the storage control circuit commonly controls the storage operations at two or more photoelectric conversion devices that are not disposed directly next to one another among the photoelectric conversion devices.

18 Claims, 5 Drawing Sheets

IMAGE SENSOR, FOCAL POINT DETECTION DEVICE AND CAMERA

INCORPORATION BY REFERENCE

The disclosure of the following priority application is herein incorporated by reference Japanese Patent Application No. 2004-364174 filed Dec. 16, 2004

BACKGROUND OF THE INVENTION

1. Field of the Invention

The present invention relates to an image sensor and a focal point detection device utilized in an autofocus camera or the like and a camera with the image sensor and the focal point detection device.

2. Description of Related Art

There are autofocus cameras that adjust the focal point of the photographic lens by detecting a subject image present in a focal point detection area set within the photographic image plane. Such an autofocus camera often adopts the so-called phase difference detection method. The focal point adjustment is achieved as described below through the phase difference detection method.

A pair of subject images is formed with light fluxes having entered through the photographic lens and passed through a focal point detection area set within the photographic image plane by using a focal point detection optical system which is provided as a separate unit independent of the photographic optical system constituted with the photographic lens. Electrical charges the quantities of which correspond to the levels of the light intensity of the pair of subject images are stored at a light receiving unit constituted with a pair of photoelectric conversion element arrays and are then converted to electrical signals corresponding to the quantities of stored electrical charges. During this process, the length of time over which the electrical charges are stored is controlled so as to output the converted electrical signals (subject image signals) with the optimal intensity.

Based upon the extent to which the image positions of the subject images according to the contrasts of the subject image signals thus obtained (hereafter simply referred to as "contrast") at the individual photoelectric conversion element arrays constituting the light receiving unit are offset relative to each other, the defocus quantity indicating the extent of defocusing of the photographic optical system relative to the predicted focal plane is calculated. By driving the focusing lens in correspondence to the calculated defocus quantity, a focus match is achieved for the photographic optical system.

A focal point detection device known in the related art, which is used in an autofocus camera adopting the phase difference detection method described above, sets a plurality of focal point detection areas within the photographic image plane and individually controls the lengths of storage time for a plurality of light receiving units each provided in correspondence to one of the focal point detection areas (see U.S. Pat. No. 5,418,594).

SUMMARY OF THE INVENTION

The focal point detection device disclosed in U.S. Pat. No. 5,418,594, which individually controls the lengths of charge storage time in correspondence to the various light receiving units, has a problem in that if a greater number of focal point-detection areas are set, the storage control means for controlling the lengths of storage time needs to have a larger scale circuit, which is bound to increase the bulk and cost of the device.

According to the 1st aspect of the invention, an image sensor comprises: three or more photoelectric conversion devices; and a storage control circuit that controls storage operations at the photoelectric conversion devices, and the storage control circuit commonly controls the storage operations at two or more photoelectric conversion devices that are not disposed directly next to one another among the photoelectric conversion devices.

According to the 2nd aspect of the invention, in the image sensor according to the 1st aspect, it is preferred that the photoelectric conversion devices are disposed in a row next to one another.

According to the 3rd aspect of the invention, in the image sensor according to the 1st aspect, it is preferred that the storage control circuit independently controls a storage operation at a photoelectric conversion device disposed at a central position among the photoelectric conversion devices.

According to the 4th aspect of the invention, in the image sensor according to the 1st aspect, it is preferred that: the three or more photoelectric conversion devices are divided into three or more groups of photoelectric conversion devices; and the storage control circuit commonly controls storage operations at photoelectric conversion devices belonging to different groups.

According to the 5th aspect of the invention, in the image sensor according to the 1st aspect, it is preferred that: the three or more photoelectric conversion devices are divided into a plurality of groups of photoelectric conversion devices; and the storage control circuit commonly controls storage at at least a photoelectric conversion device belonging to a given group and storage at at least a photoelectric conversion device belonging to another group.

According to the 6th aspect of the invention, in the image sensor according to the 5th aspect, it is preferred that the storage control circuit controls the photoelectric conversion devices belonging to the given group all separately from one another.

According to the 7th aspect of the invention, in the image sensor according to the 1st aspect, it is preferred that each of the photoelectric conversion devices comprises a plurality of photoelectric conversion elements.

According to the 8th aspect of the invention, in the image sensor according to the 1st aspect, it is preferred that the storage control circuit does not execute common control on storage operations at photoelectric conversion devices set directly next to each other.

According to the 9th aspect of the invention, in the image sensor according to the 1st aspect, it is preferred that: each of the photoelectric conversion devices comprising a plurality of photoelectric conversion elements; and the storage control circuit does not execute common control on storage operations at photoelectric conversion devices set directly next to each other and having the plurality of photoelectric conversion elements disposed along matching directions.

According to the 10th aspect of the invention, a focal point detection device comprises: a plurality of photoelectric conversion devices each used in correspondence to one of at least three focal point detection areas; a storage control circuit that controls storage operations at the photoelectric conversion devices; and a focal point detection circuit that detects states of focal adjustment achieved for the focal point detection areas based upon outputs from the photoelectric conversion devices, and the storage control circuit commonly controls storage operations at the photoelectric conversion devices corresponding to two or more focal point detection areas that are not set directly next to one another among the focal-point detection areas.

According to the 11th aspect of the invention, in the focal point detection device according to the 10th aspect, it is preferred that the storage control circuit independently controls a storage operation at a photoelectric conversion device corresponding to a focal point detection area set at a central position among the focal point detection areas.

According to the 12th aspect of the invention, in the focal point detection device according to the 10th aspect, it is preferred that: the three or more focal point detection areas are divided into three or more groups of focal point detection areas; and the storage control circuit commonly controls storage operations at photoelectric conversion devices belonging to different groups.

According to the 13th aspect of the invention, in the focal point detection device according to the 10th aspect, it is preferred that: the three or more focal point detection areas are divided into a plurality of groups of focal point detection areas; and the storage control circuit commonly controls storage at at least a photoelectric conversion devices corresponding to a focal point detection area belonging to a given group and storage at at least a photoelectric conversion device corresponding to a focal point detection area belonging to another group.

According to the 14th aspect of the invention, in the focal point detection device according to the 10th aspect, it is preferred that the storage control circuit does not execute common control on storage operations at photoelectric conversion devices set directly next to each other.

According to the 15th aspect of the invention, a camera comprises: a plurality of photoelectric conversion devices that execute photoelectric conversion of subject light fluxes each corresponding to one of three or more focal point detection areas set in a photographic field image plane achieved with a photographic optical system; and a storage control circuit that commonly controls storage operations at photoelectric conversion devices corresponding to two or more focal point detection areas that are not set directly next to one another among the focal point detection areas.

According to the 16th aspect of the invention, in the camera according to the 15th aspect, it is preferred that there is further provided a focal point detection circuit that detects states of focal adjustment achieved at the focal point detection areas based upon outputs from the plurality of photoelectric conversion devices.

According to the 17th aspect of the invention, in the camera according to the 15th aspect, it is preferred that the storage control circuit independently controls a storage operation at a photoelectric conversion device corresponding to a focal point detection area set at a central position among the focal point detection areas.

According to the 18th aspect of the invention, in the camera according to the 15th aspect, it is preferred that: the three or more focal point detection areas are divided into three or more groups of focal point detection areas; and the storage control circuit commonly controls storage operations at photoelectric conversion devices belonging to different groups.

According to the 19th aspect of the invention, in the camera according to the 15th aspect, it is preferred that: the three or more focal point detection areas are divided into a plurality of groups of focal point detection areas; and the storage control circuit commonly controls storage at at least a photoelectric conversion device corresponding to a focal point detection area belonging to a given group and storage at at least a photoelectric conversion device corresponding to a focal point detection area belonging to another group.

According to the 20th aspect of the invention, in the camera according to the 15th aspect, it is preferred that the storage control circuit does not execute common control on storage operations at photoelectric conversion devices set directly next to each other.

According to the 21st aspect of the invention, a method for controlling electrical charges at an image sensor, comprises: utilizing three or more photoelectric conversion devices; and commonly controlling storage operations at two or more photoelectric conversion devices that are not set directly next to each other among the photoelectric conversion devices.

DESCRIPTION OF PREFERRED EMBODIMENTS

First Embodiment

Figure 1:
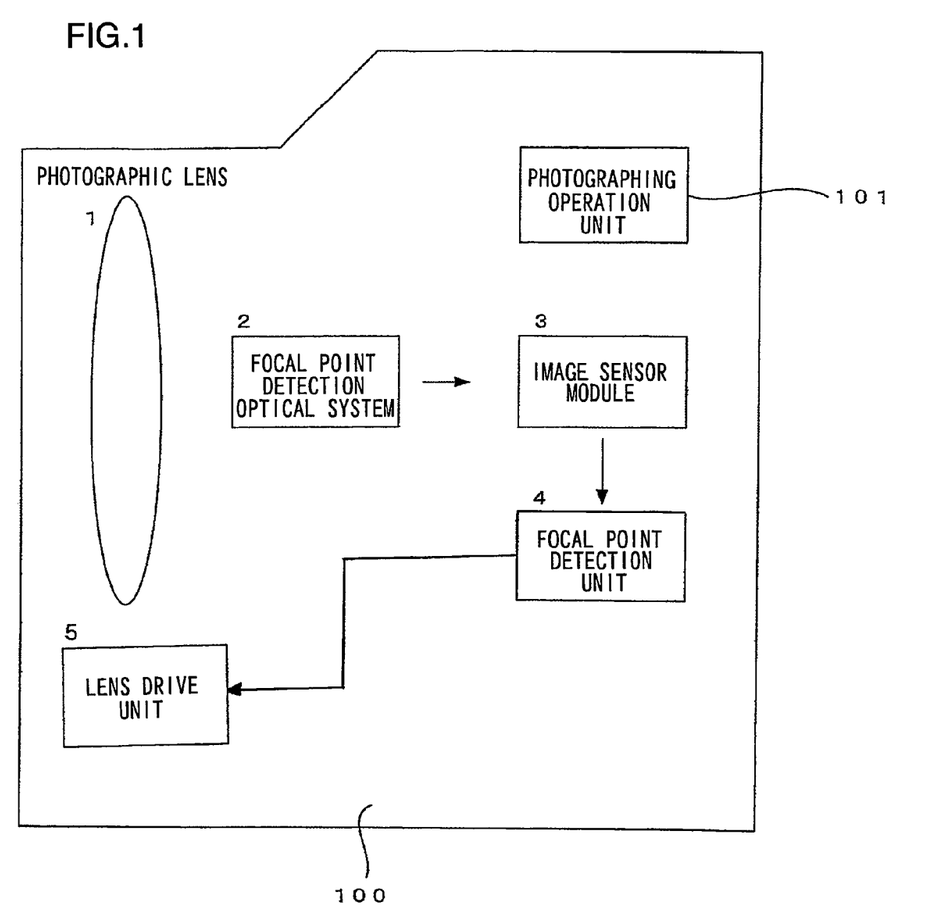
FIG. 1 shows the structure of a camera adopting an embodiment of the present invention.

FIG. 1 shows a camera that includes the focal point detection device achieved in the first embodiment of the present invention. This focal point detection device adopts the phase difference detection method to detect the state of focal adjustment achieved at a photographic lens 1 mounted at a single lens reflex camera 100. It is to be noted that in the camera 100, a photographing operation unit 101 is engaged in operation in response to a shutter release signal and a subject image is recorded at a film type image-capturing device, as known in the related art.

As the light having originated from the photographic field and passed through the photographic lens 1 enters a focal point detection optical system 2, three pairs of subject images are formed at an image sensor module 3 with light fluxes in the light from the photographic field, the ranges of which each correspond to one of three focal point detection areas set within the photographic image plane. The subject images in each pair are formed with light fluxes having passed through the photographic lens 1 at different positions. It is to be noted that the structure of the image sensor module 3 is to be described later. The image sensor module 3 may be referred to as an image sensor.

The image sensor module 3 outputs to a focal point detection unit 4 three different signal sequences each indicating the light intensity distribution in one of the three pairs of subject images having been formed. The focal point detection unit 4 calculates the image offset quantities each indicating the extent to which the subject images in one of the three subject image pairs are offset from each other based upon the corresponding signal sequence and determines a defocus quantity indicating the state of focal adjustment at the photographic lens 1 in correspondence to each focal point detection area. Then, one of the defocus quantities thus determined, e.g., the defocus quantity corresponding to the subject images formed over the shortest range, is selected and a drive command signal reflecting the selected defocus quantity is output to a lens drive unit 5. Based upon the drive command signal, the lens drive unit 5 drives the photographic lens 1 and thus adjusts the focal point of the photographic lens 1.

Figure 2:
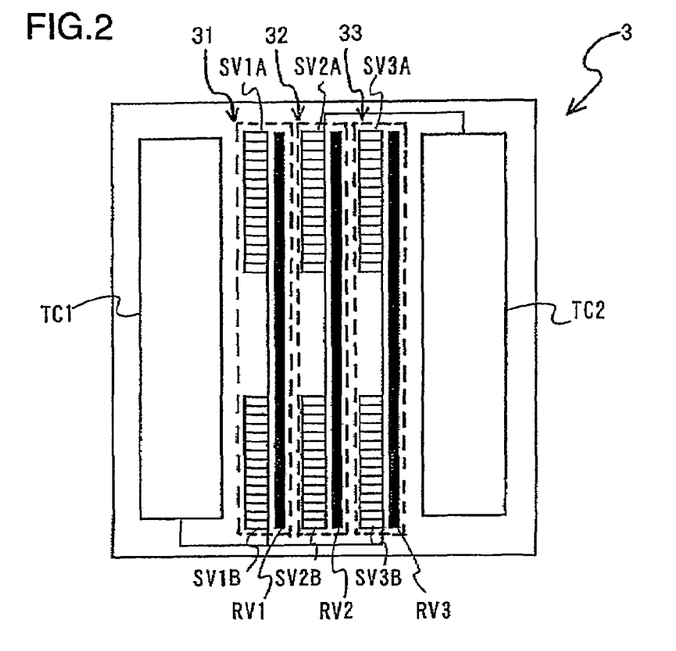
FIG. 2 shows the structure of the image sensor module.

FIG. 2 shows the structure of the image sensor module 3. The image sensor module 3 includes three photoelectric conversion devices 31, 32 and 33 and storage control circuits TC1 and TC2. A pair of photoelectric conversion element arrays SV1A and SV1B and a transfer unit RV1 are disposed at the photoelectric conversion device 31. Likewise, a pair of photoelectric conversion element arrays SV2A and SV2B and a transfer unit RV2 are disposed at the photoelectric conversion device 32, and a pair of photoelectric conversion element arrays SV3A and SV3B and a transfer unit RV3 are disposed at the photoelectric conversion device 33. The photoelectric conversion element array is constituted with solid-state imaging devices such as CCD or CMOS devices, and such elements are disposed in a single row. In other words, the photoelectric conversion device includes one-dimensional sensors (or line sensors). However, the photoelectric conversion device may include two-dimensional sensors (or area sensors).

Figure 3:
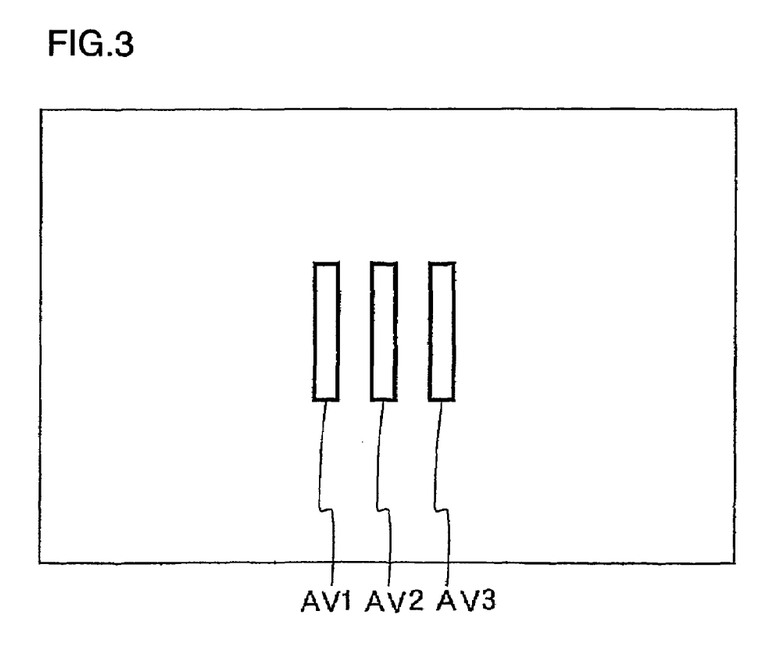
FIG. 3 shows three focal point detection areas set within the photographic image plane in the first embodiment.

As shown in FIG. 3, three focal point detection areas AV1, AV2 and AV3 are set within the photographic image plane. The photoelectric conversion devices 31 through 33 in FIG. 2 are provided each in correspondence to one of the focal point detection areas AV1 through AV3 in FIG. 3. The photoelectric conversion device 31 corresponds to the focal point detection area AV1, the photoelectric conversion device 32 corresponds to the focal point detection area AV2 and the photoelectric conversion device 33 corresponds to the focal point detection area AV3.

At the photoelectric conversion device 31, a pair of subject images are formed on the pair of photoelectric conversion element arrays SV1A and SV1B by the focal point detection optical system 2 with light fluxes with the ranges thereof corresponding to the focal point detection area AV1. At the photoelectric conversion element arrays SV1A and SV1B, each constituted with a plurality of photoelectric conversion elements set in a row, electrical charge quantities corresponding to the levels of intensity of the light in the subject images are stored at the individual photoelectric conversion elements. Likewise, electrical charges corresponding to the levels of the intensity of the light in the subject images are stored at the individual photoelectric conversion elements constituting the photoelectric conversion element arrays SV2A and SV2B and the photoelectric conversion element arrays SV3A and SV3B.

The charge storage operations at the various photoelectric conversion element arrays are controlled by the storage control circuits TC1 and TC2. The storage control circuit TC1 executes storage control for the photoelectric conversion element arrays SV1A and SV1B and the photoelectric conversion element arrays SV3A and SV3B, whereas the storage control circuit TC2 executes storage control for the photoelectric conversion element arrays SV2A and SV2B. Under their storage control, the timing with which the charge operations start and ends at the individual photoelectric conversion element arrays is controlled and the electrical charge quantities stored during the storage time are output from the photoelectric conversion element arrays to the transfer unit RV1, RV2 and RV3. It is to be noted that the storage control circuits TC1 and TC2 are each constituted with a microprocessor and the like needed to execute the processing to be detailed later.

The transfer units RV1 through RV3 convert the electrical charge quantities output from the individual photoelectric conversion element arrays to signal sequences and outputs the signal sequences resulting from the conversion to the focal point detection unit 4. Through the process described above, electrical charges are stored at the photoelectric conversion devices 31 through 33 in quantities corresponding to the levels of intensity of the light in the three pairs of subject images formed with the focal point detection optical system 2 and signal sequences reflecting the quantities of the stored electrical charges are individually output.

As described earlier, the storage control circuit TC1 executes the storage control for both the photoelectric conversion element arrays SV1A and SV1B at the photoelectric conversion device 31 and the photoelectric conversion element arrays SV3A and SV3B at the photoelectric conversion device 33. The photoelectric conversion devices 31 and 33 respectively correspond to the focal point detection areas AV1 and AV3 in FIG. 3, as explained earlier. Namely, the charge storage operations at the two photoelectric conversion devices 31 and 33 respectively corresponding to the focal point detection areas AV1 and AV3 that are not set directly next to each other among the three focal point detection areas AV1, AV2 and AV3 in the photographic image plane are both controlled by a single storage control circuit TC1.

By using a common storage control circuit TC1 to control the storage operations at both the photoelectric conversion device 31 and the photoelectric conversion device 33 as described above, the image sensor module 3 can be achieved on a smaller circuit scale compared to the circuit scale that would be required if the charge storage operations at the two photoelectric conversion devices were to be separately controlled, even when a greater number of focal point detection areas are set, i.e., even when a greater number of photoelectric conversion devices are used.

In addition, the two photoelectric conversion devices 31 and 33, commonly controlled by a single storage control circuit, respectively correspond to the focal point detection areas AV1 and AV3 which are not set directly next to each other. Thus, the storage operations can be individually controlled in correspondence to the focal point detection areas set next to each other and ultimately, optimal lengths of storage time can be set in correspondence to the individual focal point detection areas set next to each other.

For instance, let us consider a case in which subject images manifesting a change in the brightness (or luminance) over the ranges of the focal point detection areas AV1 and AV2 have been input. It is assumed that data indicating high brightness and data indicating a regular brightness have been input in correspondence to the focal point detection areas AV1 and AV2 respectively. At the photoelectric conversion device 31 corresponding to the focal point detection area AV1 containing the high brightness portion, the output signal from the high brightness portion becomes saturated. For this reason, the light intensity distribution in the subject images may not be accurately indicated, which, in turn, may lead to a failure in calculating the correct defocus quantity.

Under such circumstances, the length of storage time to elapse at the photoelectric conversion device 31 is reduced and the storage control is reexecuted to calculate the defocus quantity. The storage control is repeatedly executed by varying the length of storage time for a photoelectric conversion device manifesting saturation of an output signal until the correct defocus quantity can be calculated in a non-saturated state.

If common storage control for the photoelectric conversion devices 31 and 32 corresponding to the focal point detection areas AV1 and AV2 set next to each other was executed while repeatedly executing the storage control by varying the storage time as described above, the length of storage time at the photoelectric conversion device 32 in correspondence to which the correct light intensity distribution in the subject images is initially obtained might become shortened and thus, the correct light intensity distribution corresponding to the photoelectric conversion device 32 might become unavailable.

However, since the storage operations at the photoelectric conversion devices 31 and 32 corresponding to the focal point detection areas AV1 and AV2 set next to each other are separately controlled, i.e., since the storage operations at the photoelectric conversion devices 31 and 33 corresponding to the focal point detection areas AV1 and AV3, which are hot set next to each other, are commonly controlled, the problems discussed above do not arise in the embodiment. In other words, fine storage control can be executed separately for the photoelectric conversion devices corresponding to focal point detection areas set directly next to each other.

It is to be noted that a high brightness portion and a normal brightness portion may be contained in the focal point detection areas AV1 and AV3 which are not set directly next to each other. However, since focal point detection is executed by targeting a specific portion in the photographic field rather than the entire photographic field and, accordingly, it is more desirable to execute fine storage control individually for the photoelectric conversion devices corresponding to the focal point detection areas within such a specific local area.

Figure 4A:
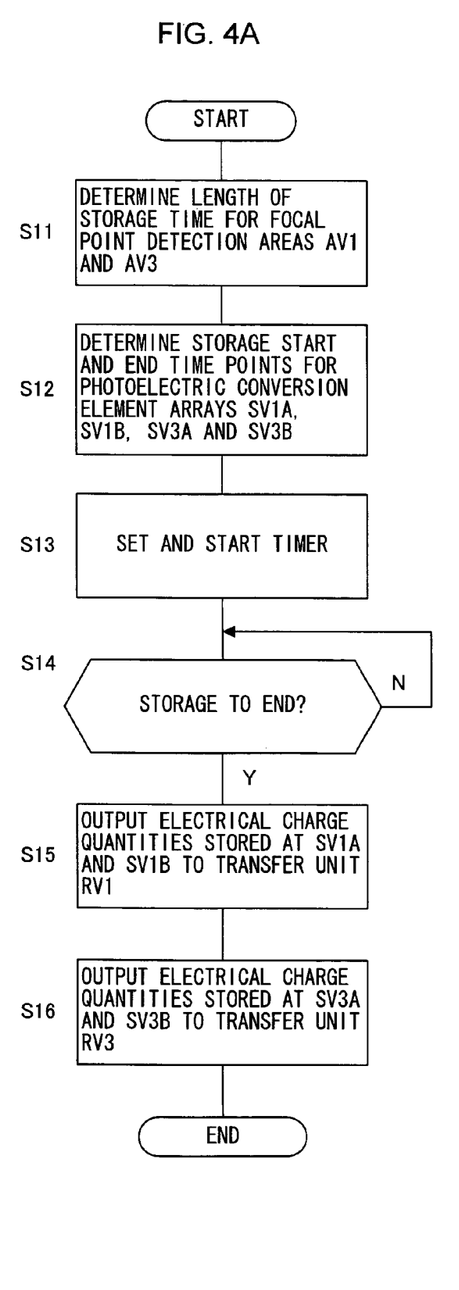
FIGS. 4A and 4B present flowcharts of the processing executed in the image-sensor module.
Figure 4B:
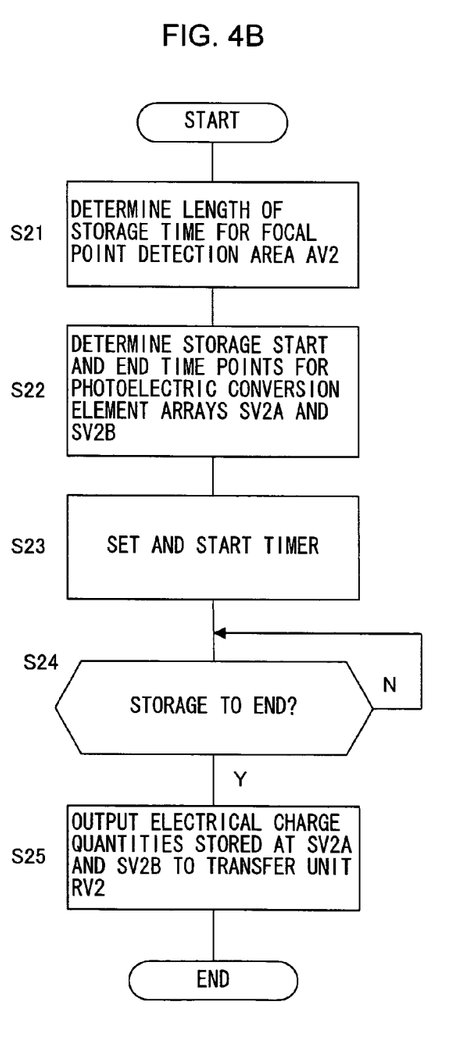

FIGS. 4A and 4B present flowcharts of the processing executed at the image sensor module 3. FIG. 4A shows the processing executed at the storage control circuit TC1, whereas FIG. 4B shows the processing executed at the storage control circuit TC2. An explanation is first given in reference to FIG. 4A. In step S11, the length of storage time corresponding to the focal point detection areas AV1 and AV3 is determined. In step S12, a storage start time point and a storage end time point are determined for the pair of photoelectric conversion element arrays SV1A and SV1B and the pair of photoelectric conversion element arrays SV3A and SV3B respectively corresponding to the focal point detection areas AV1 and AV3 for which the length of storage time has been determined in step S11. In step S13, a timer is set for the storage end time point having been determined in step S12 and storage operations at the individual sensor arrays are started.

In step S14, a decision is made as to whether or not the storage at the photoelectric conversion element arrays should now end by checking the timer having been set in step S13. Only if it is decided that the storage is to end, the operation proceeds to the following step S15. In step S15, the electrical charge quantities having been stored at the pair of photoelectric conversion element arrays SV1A and SV1B during the storage time are output to the transfer unit RV1. Subsequently, the electrical charge quantities are converted to a signal sequence at the transfer unit RV1, and the string of signals corresponding to the quantities of stored electrical charges is output from the photoelectric conversion device 31 to the focal point detection unit 4.

In step S16, the electrical charge quantities having been stored at the pair of photoelectric conversion element arrays SV3A and SV3B during the storage time are output to the transfer unit RV3, as in step S15. Subsequently, the electrical charge quantities are converted to a signal sequence at the transfer unit RV3, and the string of signals corresponding to the quantities of stored electrical charges is output from the photoelectric conversion device 33 to the focal point detection unit 4. Once step S16 is executed, the processing in FIG. 4A ends. Based upon the signal sequences thus output, the focal point detection unit 4 calculates the defocus quantities corresponding to the focal point detection areas AV1 and AV3. If an accurate defocus quantity has not been calculated at the focal point detection unit 4, the processing in the steps described above is repeatedly executed by varying the length of storage time.

Next, the flow of the processing in FIG. 4B executed by the storage control circuit TC2 is explained. In step S21, the length of storage time corresponding to the focal point detection area AV2 is determined. In step S22, a storage start time point and a storage end time point are determined for the pair of photoelectric conversion element arrays SV2A and SV2B corresponding to the focal point detection areas AV2 for which the length of storage time has been determined in step S21. In step S23, a timer is set for the storage end time point having been determined in step S22 and storage operations at the photoelectric conversion element arrays SV2A and SV2B are started.

In step S24, a decision is made as to whether or not the storage at the photoelectric conversion element arrays SV2A and SV2B should now end by checking the timer having been set in step S23. Only if it is decided that the storage is to end, the operation proceeds to the following step S25. In step S25, the electrical charge quantities having been stored at the pair of photoelectric conversion element arrays SV2A and SV2B during the storage time are output to the transfer unit RV2. Subsequently, the electrical charge quantities are converted to a signal sequence at the transfer unit RV2, and the string of signals corresponding to the quantities of stored electrical charges is output from the photoelectric conversion device 32 to the focal point detection unit 4. Once step S25 is executed, the processing in FIG. 4B ends. Based upon the signal sequence thus output, the focal point detection unit 4 calculates the defocus quantity corresponding to the focal point detection area AV2. If an accurate defocus quantity has not been calculated at the focal point detection unit 4, the processing in the steps described above is repeatedly executed by varying the length of storage time.

In the embodiment described above, the storage operations at the two photoelectric conversion devices 31 and 33 respectively corresponding to the focal point detection areas AV1 and AV3 which are not set directly next to each other, among the three focal point detection areas AV1, AV2 and AV3 within the photographic image plane are commonly controlled by a single storage control circuit TC1. As a result, the circuit scale of the image sensor module 3 does not need to become large even when a greater number of focal point detection areas are set. In addition, even when the correct length of storage time relative to the brightness of the subject images is not initially set, the likelihood of it being adjusted to the optimal length of storage time is increased.

Second Embodiment

Figure 5:
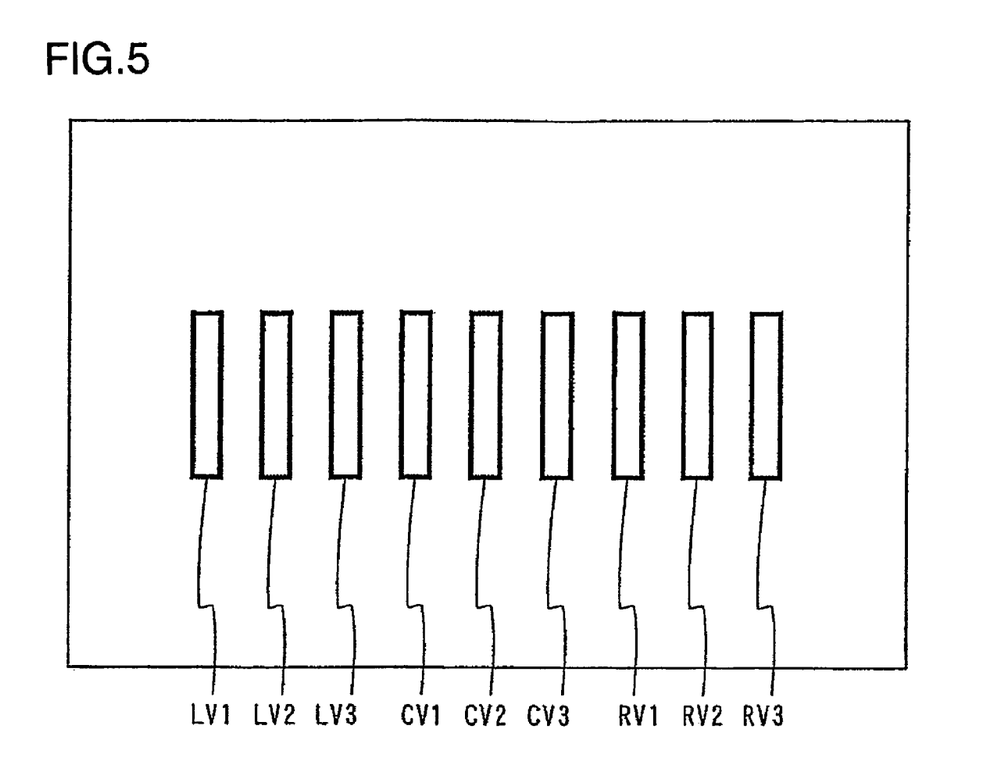
FIG. 5 shows nine focal point detection areas set within the photographic image plane in a second embodiment.

FIG. 5 shows focal point detection areas set within the photographic image plane in the second embodiment. Since the structure of the camera 100 is similar to that adopted in the first embodiment, its explanation is omitted and the following explanation focuses on the focal point detection areas and the corresponding photoelectric conversion devices.

In the first embodiment, three focal point detection areas AV1, AV2 and AV3 are set within the photographic image plane and the storage operations at the two photoelectric conversion devices 31 and 33 respectively corresponding to the focal point detection areas AV1 and AV3 which are not set directly next to each other are commonly controlled by a single storage control circuit TC1. In the second embodiment, nine focal point detection areas LV1, LV2, LV3, CV1, CV2, CV3, RV1, RV2 and RV3 are set within the photographic image plane as shown in FIG. 5. In conjunction with these focal point detection areas, a single storage control circuit can be used as a common control circuit for controlling the storage operations at a plurality of photoelectric conversion devices corresponding to a plurality of focal point detection areas that are not set directly next to each other.

For instance, the three photoelectric conversion devices corresponding to the focal point detection areas LV1, CV1 and RV1 may be controlled by a single storage control circuit. Likewise, another storage control circuit may be utilized to control the three photoelectric conversion devices corresponding to the focal point detection areas LV2, CV2 and RV2 and yet another storage control circuit may be utilized to control the three photoelectric conversion devices corresponding to the focal point detection areas LV3, CV3 and RV3.

Namely, the plurality of focal point detection areas are divided into a group that includes the focal point detection areas LV1, LV2 and LV3, a group that includes the focal point detection areas CV1, CV2 and CV3 and a group that includes the focal point detection areas RV1, RV2 and RV3. The photoelectric conversion devices corresponding to three focal point detection areas, each representing one of the three groups are commonly controlled. In other words, common storage control is executed for the photoelectric conversion device corresponding to a focal point detection area belonging to a given group and the photoelectric conversion device corresponding to a focal point detection area belonging to another group. This means that the storage control is executed separately for the individual photoelectric conversion devices corresponding to the plurality of focal point detection areas in each group.

As a result, the circuit scale of the image sensor module 3 does not become large even when a greater number of focal point detection areas are set and also, fine storage control can be separately executed for the individual photoelectric conversion devices corresponding to different focal point detection areas within a specific local range.

Third Embodiment

Figure 6:
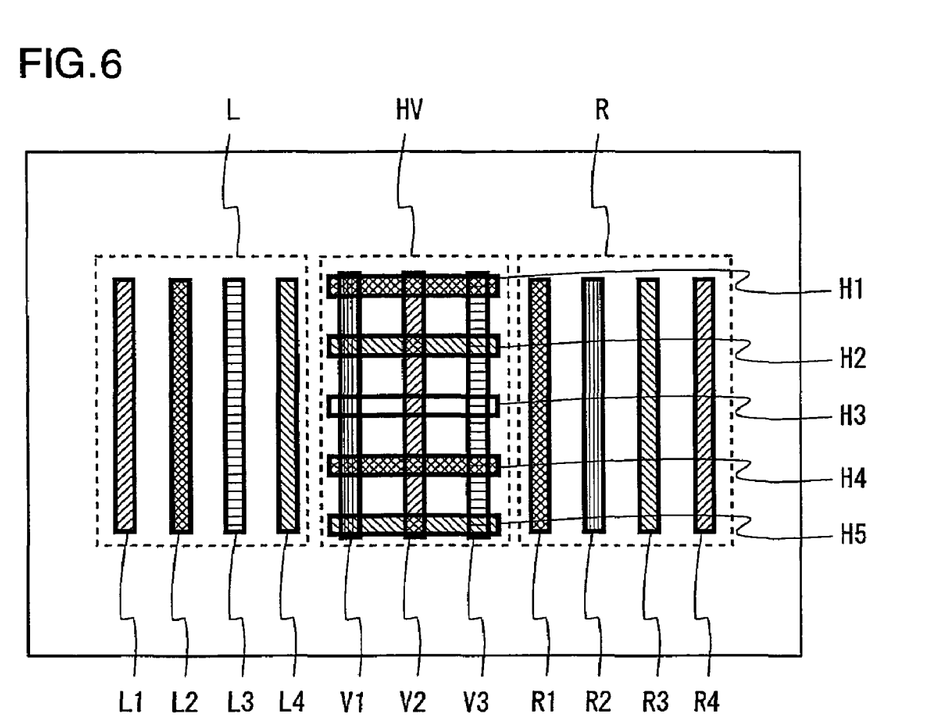
FIG. 6 shows sixteen focal point detection areas set within the photographic image plane in a third embodiment.

FIG. 6 shows focal point detection areas set within the photographic image plane in the third embodiment. Since the structure of the camera 100 is similar to that adopted in the first embodiment, its explanation is omitted and the following explanation focuses on the focal point detection areas and the corresponding photoelectric conversion devices.

FIG. 6 shows the sixteen focal point detection areas set within the photographic image plane, which are divided into separate area groups (blocks) L, HV and R. Focal point detection areas H1, H2, H3, H4 and H5 in the area group HV are set in a lateral orientation, whereas the other focal point detection areas in the area group HV are set in a longitudinal orientation. In other words, the photoelectric conversion devices corresponding to the focal point detection areas H1, H2, H3, H4 and H5 are set along a direction forming a 90° angle relative to the direction of the photoelectric conversion devices corresponding to the remaining focal point detection areas.

In this structure, the storage operations at the photoelectric conversion devices corresponding to the focal point detection areas L1, V2 and R4 are commonly controlled, the storage operations at the photoelectric conversion devices corresponding to the focal point detection areas L2, H1, H4 and R1 are commonly controlled, the storage operations at the photoelectric conversion devices corresponding to the focal point detection areas L3, and V3 are commonly controlled, the storage operations at the photoelectric conversion devices corresponding to the focal point detection areas L4, H2, H5 and R3 are commonly controlled, and the storage operations at the photoelectric conversion devices corresponding to the focal point detection areas V1 and R2 are commonly controlled.

Thus, the storage operations corresponding to the focal point detection areas L1, L2, L3 and L4 in the area group L, for instance, among the area groups L, HV and R on the photographic image plane are controlled separately from one another. Namely, while the storage operations corresponding to specific focal point detection areas are commonly controlled, fine storage control can be executed in correspondence to the focal point detection areas belonging to a certain area group in the structure adopted in the third embodiment. As a result, highly accurate focal point detection is enabled.

Apart from the laterally oriented focal point detection areas in the area group HV, the storage operations for the focal point detection areas in each area group are controlled independently of one another in the third embodiment. At the same time, the storage operations corresponding to focal point detection areas belonging to different area groups set over the greatest possible distance from each other, are commonly controlled.

It is to be noted that the storage operations corresponding to the focal point detection area L4 in the area group L and the focal point detection area H2 in the area group HV are commonly controlled. While they do appear to be in close proximity to each other, they extend along different directions from each other and for this reason, they are not regarded to lie next to each other. In addition, the storage operations corresponding to the focal point detection area R1 in the area group R and the focal point detection areas H1 and H4 in the area group HV are also commonly controlled. While they do appear to be in close proximity to each other, they extend along different directions and, for this reason, they are not regarded to lie next to each other. Namely, only focal point detection areas with the individual elements at the corresponding photoelectric conversion devices set along the same direction, i.e., with the corresponding photoelectric conversion devices extending substantially parallel to one another, are considered to lie next to one another.

The storage operation corresponding to the laterally oriented focal point detection area H3 in the middle area group HV in FIG. 6 is controlled by itself, since the central focal point detection area H3 is used with high frequency and for this reason it is necessary to ensure that the storage operation corresponding to this area is not affected by the storage operations for the other focal point detection areas.

In the third embodiment, too, the circuit scale of the image sensor module 3 does not become large even when a greater number of focal point detection areas are set and also, fine storage control can be separately executed for the individual photoelectric conversion devices corresponding to the different focal point detection areas set within a specific local range.

An explanation is given above in reference to the embodiments on an example in which a pair of photographic images are formed for purposes of focal point detection on a pair of photoelectric conversion element arrays disposed at each photoelectric conversion device and the focal point detection is executed by adopting the phase difference detection method. However, the focal point detection may be executed by adopting a method other than the phase difference detection method. The present invention may be adopted with equal effectiveness in conjunction with any other method, as long as a subject image is formed on a photoelectric conversion device with a light flux in the light originating from the photographic field, the range of which corresponds to a focal point detection area, the electrical charges are stored in quantities corresponding to the intensity of the light in the subject image at the photoelectric conversion device and the state of the focal adjustment achieved with the photographic lens is detected based upon a signal sequence output in correspondence to the quantities of the electrical charges having been stored.

For instance, the present invention may be adopted in conjunction with a method in which an image sensor (or an image-capturing element) provided for purposes of capturing images may be used to store electrical charges indicating the intensity of the light in the subject image formed on the pixels corresponding to a focal point detection area and the state of focal adjustment achieved with the photographic lens is detected based upon a signal sequence output in correspondence to the quantities of the stored electrical charges. In such a case, charges may be stored at a two-dimensional photoelectric conversion element group instead of a one-dimensional photoelectric conversion element row. Alternatively, a single photoelectric conversion element may be used.

In addition, an explanation is given above in reference to the embodiments on an example in which the storage operations at a plurality of photoelectric conversion devices are commonly controlled with a single storage control circuit by setting a uniform length of storage time and uniform timing for starting and ending the storage operations. However, the present invention is not limited to this example and it may be adopted in various types of storage control. For instance, control may be executed by setting a uniform length of storage time alone. Furthermore, control may be executed by specifying corresponding pixels in different photoelectric conversion devices for electrical charges storage.

While an explanation is given above in reference to the embodiments on an example in which the present invention is adopted in the single lens reflex type camera 100 using a film, the present invention is not limited to this example and it may be adopted in a compact camera, a digital camera, a camera mounted on a portable telephone or the like or a video camera. Moreover, the present invention may be adopted in an apparatus other than a camera, such as a microscope or another type of optical apparatus. In other words, the present invention may be adopted in all types of apparatuses in which the focal point needs to be detected.

The above described embodiments are examples, and various modifications can be made without departing from the spirit and scope of the invention.

What is claimed is:

1. An image sensor comprising:
   three or more photoelectric conversion devices that are positioned in parallel;
   a first storage control circuit that commonly controls storage operations at two or more photoelectric conversion devices that are not disposed directly next to one another among the photoelectric conversion devices; and
   a second storage control circuit that controls storage operations at one or more photoelectric conversion devices other than the two or more photoelectric conversion devices controlled by the first storage control circuit.

2. An image sensor according to claim 1, wherein:
   the photoelectric conversion devices are disposed in a row next to one another.

3. An image sensor according to claim 1, wherein:
   the second storage control circuit independently controls a storage operation at a photoelectric conversion device disposed at a central position among the photoelectric conversion devices.

4. An image sensor according to claim 1, wherein:
   the three or more photoelectric conversion devices are divided into three or more groups of photoelectric conversion devices; and
   the first storage control circuit commonly controls storage operations at photoelectric conversion devices belonging to different groups.

5. An image sensor according to claim 1, wherein:
   the three or more photoelectric conversion devices are divided into a plurality of groups of photoelectric conversion devices; and
   the first storage control circuit commonly controls storage at at least a photoelectric conversion device belonging to a given group and storage at at least a photoelectric conversion device belonging to another group.

6. An image sensor according to claim 5, wherein:
   the first storage control circuit controls the photoelectric conversion devices belonging to the given group all separately from one another.

7. An image sensor according to claim 1, wherein:
   each of the photoelectric conversion devices comprises a plurality of photoelectric conversion elements.

8. An image sensor according to claim 1, wherein:
   each of the photoelectric conversion devices comprises a plurality of photoelectric conversion elements; and
   the first storage control circuit does not execute common control on storage operations at photoelectric conversion devices set directly next to each other and having the plurality of photoelectric conversion elements disposed along matching directions.

9. A focal point detection device comprising:
   a plurality of photoelectric conversion devices each used in correspondence to one of at least three focal point detection areas that are positioned in parallel;
   a focal point detection circuit that detects states of focal adjustment achieved for the focal point detection areas based upon outputs from the photoelectric conversion devices;
   a first storage control circuit that commonly controls storage operations at photoelectric conversion devices corresponding to two or more focal point detection areas that are not set directly next to one another among the focal point detection areas; and
   a second storage control circuit that controls storage operations at one or more photoelectric conversion devices set corresponding to two focal point detection areas other than the two or more photoelectric conversion devices controlled by the first storage control circuit.

10. A focal point detection device according to claim 9, wherein:
    the second storage control circuit independently controls a storage operation at a photoelectric conversion device corresponding to a focal point detection area set at a central position among the focal point detection areas.

11. A focal point detection device according to claim 9, wherein:
    the three or more focal point detection areas are divided into three or more groups of focal point detection areas; and
    the first storage control circuit commonly controls storage operations at photoelectric conversion devices belonging to different groups.

12. A focal point detection device according to claim 9, wherein:
- the three or more focal point detection areas are divided into a plurality of groups of focal point detection areas; and
- the first storage control circuit commonly controls storage at at least a photoelectric conversion devices corresponding to a focal point detection area belonging to a given group and storage at at least a photoelectric conversion device corresponding to a focal point detection area belonging to another group.

13. A camera comprising:
- a plurality of photoelectric conversion devices that execute photoelectric conversion of subject light fluxes each corresponding to one of three or more focal point detection areas set in a photographic field image plane in parallel achieved with a photographic optical system;
- a first storage control circuit that commonly controls storage operations at photoelectric conversion devices corresponding to two or more focal point detection areas; and
- a second storage control circuit that controls storage operations at one or more photoelectric conversion devices set corresponding to two focal point detection areas other than the two or more photoelectric conversion devices controlled by the first storage control circuit.

14. A camera according to claim 13, further comprising:
- a focal point detection circuit that detects states of focal adjustment achieved at the focal point detection areas based upon outputs from the plurality of photoelectric conversion devices.

15. A camera according to claim 13, wherein:
- the second storage control circuit independently controls a storage operation at a photoelectric conversion device corresponding to a focal point detection area set at a central position among the focal point detection areas.

16. A camera according to claim 13, wherein:
- the three or more focal point detection areas are divided into three or more groups of focal point detection areas; and
- the first storage control circuit commonly controls storage operations at photoelectric conversion devices belonging to different groups.

17. A camera according to claim 13, wherein:
- the three or more focal point detection areas are divided into a plurality of groups of focal point detection areas; and
- the first storage control circuit commonly controls storage at at least a photoelectric conversion device corresponding to a focal point detection area belonging to a given group and storage at at least a photoelectric conversion device corresponding to a focal point detection area belonging to another group.

18. A method for controlling electrical charges at an image sensor, comprising:
- utilizing three or more photoelectric conversion devices that are positioned in parallel; and
- commonly controlling storage operations at two or more photoelectric conversion devices that are not set directly next to each other among the photoelectric conversion devices with a first storage control circuit; and
- controlling storage operations at one or more photoelectric conversion devices other than the two or more photoelectric conversion devices controlled by the first storage control circuit with a second storage control circuit.

* * * * *